United States Patent [19]

Failmezger

[11] 3,984,596

[45] Oct. 5, 1976

[54] DECORATED GYPSUM BOARD WITH EXPANDED INORGANIC PARTICLE COATING

[75] Inventor: Friedrich Failmezger, Des Plaines, Ill.

[73] Assignee: United States Gypsum Company, Chicago, Ill.

[22] Filed: Aug. 19, 1974

[21] Appl. No.: 498,501

Related U.S. Application Data

[62] Division of Ser. No. 130,433, April 1, 1971, abandoned.

[52] U.S. Cl. .............................. 428/144; 428/147; 428/220; 428/538; 427/261
[51] Int. Cl.² ............................................ B32B 3/20
[58] Field of Search ............ 161/182, 165; 428/144, 428/147, 220, 538

[56] References Cited
UNITED STATES PATENTS

| | | | |
|---|---|---|---|
| 2,752,275 | 6/1956 | Raskin et al. ........................ | 161/104 |
| 3,147,177 | 9/1964 | Owens et al. ........................ | 161/161 |
| 3,427,176 | 2/1969 | Moriva ................................. | 106/157 |
| 3,507,684 | 4/1970 | Wallen ................................. | 156/46 X |

*Primary Examiner*—Harold Ansher
*Assistant Examiner*—Patricia C. Ives
*Attorney, Agent, or Firm*—Kenneth E. Roberts; Samuel Kurlandsky; Donnie Rudd

[57] ABSTRACT

A dried gypsum board article and a gypsum board to be dried, the latter comprising a wet gypsum core and a cover sheet to be securely laminated thereto in drying and a coating composition, the cover sheet having a porosity between about 90 and about 260 as determined by ASTM D 726-58; the coating composition comprising a pigment binder and expanded inorganic particles present in an amount sufficient to provide the coated cover sheet with a porosity of no higher number than about 2500 seconds as determined by ASTM D 726-58. Thereby the wet core, paper and coating composition are capable of being simultaneously dried without delaminating the sheet from the core.

8 Claims, No Drawings

DECORATED GYPSUM BOARD WITH EXPANDED INORGANIC PARTICLE COATING

This is a divisional of application Ser. No. 130,433, filed on Apr. 1, 1971, and now abandoned.

BACKGROUND OF THE INVENTION

To decorate gypsum wallboard, until recently the only manner in which this could be accomplished was by a process separate and apart from the actual formation of the board from the slurry of calcined gypsum. That is, the tendency of the paper cover sheets to "blow" have prevented a coating of paint, which conventionally is relatively impermeable, from being applied to a board wherein the core is set but still wet, prior to kiln drying. In the past, any impermeable substance applied to the paper cover sheet prior to drying the core either caused the sheet to separate or delaminate from the core as moisture is driven off in the drier, or required impractically slow drying speeds. As will be obvious, the more impermeable the coating composition became, such as by the addition of cellulosic thickeners to paint, the more a sheet coated with the same was blown off the core during drying.

Thus, decorations such as paint have either been applied previously to the cover sheet, which tends to damage the decoration as the boards are cast with the predecorated face resting on the support, or they have been applied to the completely dry and otherwise finished board. Either procedure is relatively expensive as it involves a separate handling and drying step. It has long been desired to produce a decorated board wherein the drying of the decorations, as well as of the core, can be accomplished in a single drying step.

Recently, a process was provided as disclosed in U.S. Pat. No. 3,507,684, which accomplished the goal of a single drying step. The painting or other coating of the still-wet board was rendered possible in that process by adding solids to the coating which rendered the cover sheet, not the coating itself, more porous than it would otherwise be. Such solids were pressed into the cover sheet, thus penetrating the same so that moisture could escape when driven off during the drying. The resulting board of necessity had a textured decorative appearance, and the examples disclosed in said patent were limited to a paint wherein the binder was a large particle size homopolymer emulsion. There is disclosed only the use of acrylic emulsions as thickeners, cellulosic thickeners having been specifically disclaimed.

SUMMARY OF THE INVENTION

This disclosure relates to a process and the product thereof which will permit a multiplicity of decorative coating compositions, including non-textured coatings, to be modified in porosity without affecting their decorative appeal, so as to be readily applied to gypsum board still in the wet core stage. More specifically a method of making gypsum wallboard and the paint and the wallboard resulting therefrom, has been provided wherein the paint is rendered sufficiently porous so as to not blow the cover sheet when the painted sheet and core are dried simultaneously. This has been accomplished by several discoveries. First, it has been discovered that a coated paper cover sheet can be dried at practical production line speeds without blowing from the core if its porosity, as measured by the procedures set forth in ASTM D 726–58, is at least that which allows 100 ml of air to pass therethrough in no more than about 2500 seconds. Second, it has been further discovered that coating compositions such as substantially all commonly used paints can be rendered sufficiently porous to meet this criterion by adding to the composition sufficient amounts of expanded inorganic particles of which expanded perlite is one example. The least sufficient amount for any of the paints tested was an amount of the expanded particles which represented about 0.7 percent by weight of the total coating composition. A third discovery is that the expanded particles, if kept small enough, will provide the porosity without giving a texturing appearance to the coating composition.

Accordingly, it is an object of the invention to provide a method of coating gypsum wallboard while the core is still wet, which will permit simultaneous core and coating drying and will produce a coating that need not be textured and can incorporate a wide variety of pigment binders.

It is a related object to produce a decorated wallboard resulting from the aforedescribed process.

It is a further related object to provide improved porosity in a variety of paints and coating compositions, including those with cellulosic thickeners, without necessarily producing a textured appearance.

It is yet another object of the invention to provide coating compositions which utilize non-texturing expanded particles solely for the purpose of giving the compositions a minimum porosity.

Still another object is to provide such methods, wallboard, and coating compositions which will permit even the most impervious of additives, including thickeners, to be added to the composition, and still achieve the minimum desired porosity.

Other objects and advantages will become apparent upon reference to the following detailed description.

DESCRIPTION OF THE PREFERRED EMBODIMENTS

The invention relates to a process, coating composition, and gypsum wallboard coated therewith, which greatly enhances the porosity of the coating composition. More specifically, to render a variety of coating compositions sufficiently porous so as to permit them to be coated on a paper sheet-covered gypsum wallboard core while the latter is set but still wet, the coating and the core thereafter being dried simultaneously, the coating composition has added to the pigment binder preferably as a last step in the making of the composition, an amount of expanded inorganic particles having a size which is sufficiently small as to give to the coating composition no discernible texturing effect. The amount of the particles need only be sufficient to obtain, in the case of wet wallboard coated and dried at practical factory or production line speeds, a porosity of the combined coated wallboard paper which when dry is at least as high as the value of about 2500 seconds as determined by ASTM D 726–58. As is well-known, this ASTM method measures the time required to pass 100 ml. of air through a one square inch of test paper. The equipment used comprised a Gurley-Hill S-P-S Tester. It is estimated that the experimental error in reading the times for such air passage was at least 10 percent, and probably more for the larger readings. Thus, by "about 2500 seconds" it is meant 2500 seconds plus or minus at least 250 seconds.

The invention provides increased porosity for a great variety of paints, including those which heretofore have been so impervious as to be unusable as a wet wallboard coating composition. Included in this category are small-size emulsions used as the pigment binder which small size is defined as a size of particles which does not exceed 0.2 microns. Thus, representative examples of the paints which may be used are acrylic, alkyd, and polyvinyl acetate emulsions. Further, these paints may have added thereto thickeners which decrease the porosity to the point where, heretofore, they have been totally unusable on wet wallboard. Representative examples of such additives are cellulosic, gum, and alginate thickeners.

The expanded inorganic particles which are disclosed hereinafter in specific examples and which accomplish the aforestated results and properties consist of expanded perlite. However, the invention is not limited thereto as preliminary tests indicate that other expanded particles, such as expanded vermiculite, are suitable even though larger amounts may be required for equal results.

A preferred size distribution for the expanded particles, and that which was tested, is a fine grade of expanded perlite wherein at least 75 percent of the particles passes through a standard 325 mesh screen. This size is preferred as insuring that no texture will be given to the coating composition. In contrast, a coarser grade of expanded perlite characterized by 100% on a 200 standard mesh did produce a slight texturing effect. Thus, it will be readily apparent that, should texturing be desired, a coarser grade perlite should be used. Preliminary tests show that porosity is not significantly changed when coarser grades are used.

The mechanism by which the expanded particles improve the porosity is not well understood. It is thought that these particles are distributed throughout the coating composition thereby forming microscopic passages in the paint for moisture escape.

Turning now to the process of making gypsum wallboard, and the resulting product, in accordance with the invention, conventional board forming equipment is used and a conventional aqueous slurry of calcined gypsum or "stucco" is deposited on a conventional gypsum board paper cover or face sheet which extends about three inches wider than the width of the finished board. The porosity of gypsum board paper may vary between about 90 seconds and about 260 seconds, as determined by ASTM D 726–58. A back sheet, which may be of the same porosity, is added, and the wider edges of the cover sheet are folded up over the back sheet and bonded thereto, to produce the desired thickness of the board. This can be done at various operating lineal speeds, varying from 60 feet per minute to more than 100 feet per minute. As the continuous board moves down the production line on the belt the calcined gypsum hydrates and sets so that after about eight minutes the board is quite firm. At this point, unless only the back sheet is to be coated, the board which by now is hydrated or set, is inverted by conventional apparatus. A coating composition prepared in accordance with the invention and hereinafter described in detail is applied to the upwardly exposed board paper, the time from the initial depositing of the slurry being between about 8 and 10 minutes. The rate of application of the coating may be between about 20–40 pounds of solids per 1000 square feet of board, and may be applied to a thickness of between about 3 mils and about 5 mils. Thereafter, the board is dried in conventional driers, the coating composition and the core being dried simultaneously. All of the moisture in the core is driven off at this stage through the paper. It has been found that only coating compositions having porosity which is measured to be no larger in numerical value than about 2500 seconds will permit this to occur without requiring impractically slow drying speeds or causing the sheet to blow or otherwise separate from the core, which sheet in the final product is securely laminated to the core. By "impractically slow", it is meant drying speeds which reduce the production line speed substantially below 60 feet per minute.

Turning now to the porous coating compositions which may be used in the above-described board-making process, paints are conventionally prepared with pigments, pigment binders, and additives, and preferably as a last step and prior to it being used in the board-making process, expanded perlite is mixed into the composition until uniformly distributed, in amounts sufficient to obtain the desired porosity. It has been found that the addition of the perlite prior to the grinding of the paint tends to render the perlite finer, but about equally as effective in rendering the paint porous.

To further understand the invention, the following examples are given of paints which were prepared and tested by drawing down on the test paper a coating of the specified thickness using a vacuum assist, force drying at 325° F. for 2½ minutes, and testing on the aforementioned Gurley Tester following the procedures set forth by ASTM D 726–58. Each tested value should be assigned a plus or minus 10% variation based on experimental error.

Each formulation used as the clay a water washed white clay with a particle size larger than about 0.7 micron and preferably with a size of about 4.8 microns. The clay with larger particles tended to produce a more porous coating. Viscosity of the coating desirably is from 190 to 360 Brabender but for a sharper texture it may be adjusted to more than 400. A suitable wetting and dispersing agent was an anionic polymer type dispersing agent, the sodium salt of a polymeric carboxylic acid sold by Rohm and Haas under the mark "Tamol 731". A suitable defoamer was "Nopco NDW", a nonionic liquid product sold by Nopco Chemical Co.

EXAMPLE 1

Formula A

| Ingredient | Parts by Weight |
| --- | --- |
| Water | 320 pounds |
| Phenyl mercuric acetate | 0.8 |
| Triethanolamine | 8 |
| Wetting and dispersing agent | 1.6 |
| Defoamer | 3.2 |
| Clay | 268 |
| Pigment $TiO_2$ | 100 |
| Polyvinyl acetate emulsion, 55% solids | 192 |
| Ethylene glycol | 4 |
| Premix: | |
|   Acrylic thickener | 16 |
|   Water | 40 |
| Hexylene glycol | 8 |

A suitable acrylic thickener for the above was Acrysol ASE 60, an acid-containing, cross-linked acrylic emulsion copolymer manufactured by Rohm and Haas.

Seven of the above mixes were prepared, to which were added expanded perlite in amounts set forth below. The perlite was "Tennsil 2-C" prepared by Chemrock Corporation and having a size distribution as follows:

On 100 standard mesh, 2.9% max.;
On 200 standard mesh, 5.0% max.;

a lower porosity. Several of the tests which follow were performed on draw-down paper rather than gypsum board paper, and a correction factor had to be established.

| FORMULA | WEIGHT % PERLITE | PAPER POROSITY | PAPER + COATING | COATING ALONE | COATING ALONE (CORRECTED) | PAPER + COATING (CORRECTED) |
|---|---|---|---|---|---|---|
| A8 | None (control) | 94 sec. | 2400 sec. | 2306 sec. | 3391 sec. | 4150 sec. |
| A9 | 1 | 96 | 1320 | 1224 | 2065 | 2324 |
| A10 | 2 | 96 | 900 | 804 | 1357 | 1616 |
| A11 | 3.12 | 94 | 668 | 574 | 969 | 1228 |
| A12 | 4.16 | 96 | 430 | 334 | 564 | 823 |
| A13 | 5.2 | 96 | 344 | 240 | 405 | 664 |
| A14 | 6.24 | 106 | 280 | 174 | 294 | 553 |

Through 325 standard mesh, 75.0% minimum (all mesh sizes being U.S. Standard).

Formula A1 — no perlite (control)
Formula A2 — 10 pounds (1% by total wt.)
Formula A3 — 20 pounds (2% by total wt.)
Formula A4 — 30 pounds (3.12% by total wt.)
Formula A5 — 40 pounds (4.16% by total wt.)
Formula A6 — 50 pounds (5.2% by total wt.)
Formula A7 — 60 pounds (6.24% by total wt.)

Each of these was drawn down on gypsum board paper itself having a porosity of 259 seconds, to a 3 mil thickness, and the following porosities obtained by the afore-described test procedure:

| Formula | Paper and Coating porosity | Coating Only |
|---|---|---|
| A1 | 3391 seconds | 3132 seconds |
| A2 | 2205 | 1946 |
| A3 | 1684 | 1425 |
| A4 | 1152 | 893 |
| A5 | 796 | 537 |
| A6 | 684 | 425 |
| A7 | 577 | 318 |

Thus, it is apparent that Formula A2 comprising 1% perlite produced a coating which gave a combined paper-coating porosity number well within the limiting figure of about 2500 seconds. Plotting these results on semi-log graph paper reveals that about 0.7% of expanded perlite in Formula A will produce the minimum acceptable porosity of about 2500 seconds.

EXAMPLE 2

Formula A was repeated, and seven mixes thereof with perlite were prepared as before, the individual samples being then drawn down on unsealed draw-down paper weighing 26.44 lbs/M for 8½ inch by 11 inch size, hereafter called "draw-down" paper, having The column labeled "Paper and Coating Corrected" was obtained by multiplying the value of the "Paper and Coating" column by the correction factor 1.6873. This factor in turn was obtained by taking the ratio of the value the "coating Alone" columns in Example 2, to the value of the same column in Example 1, and taking the average of the ratio. That is, it will be apparent that the sole difference in the conditions of the tests in Example 2 from those of Example 1 are the paper used. After the porosity of the paper has been accounted for, the Coating Alone columns ideally should be identical within experimental error. That they are not gives rise to the need to apply a correction factor. It will be noted that the "Coating Alone (corrected)" column gives results which generally are within the experimental error assigned to the figures for "Paper and Coating Porosity" in Example 1, as they should be. Then, to ascertain what the "paper and coating (Corrected)" figures should be, the gypsum board paper porosity previously tested, namely 259 seconds, was added back in. The resulting figure is an estimate of what the gypsum board paper would have produced if tested in this case. It will be noted these figures are comparable with the "Paper and Coating" figures of Example 1.

The correction factor of 1.6873 is applied to all further examples hereinafter set forth where the paper tested is draw-down paper having a porosity of around 100 seconds. In addition, 259 seconds is added in to obtain a "corrected" Paper and coating value. It will be obvious that, if a more porous gypsum board paper is to be used, a lower value than 259 should be added in to obtain this latter corrected value.

EXAMPLE 3

Seven more mixes of Formula A were made and various amounts of perlite were added thereto as before except that the coatings drawn down on the draw-down paper were 5 mils thick rather than 3 mils. The porosities were as follows:

| FORMULA | WEIGHT % OF PERLITE | PAPER POROSITY | PAPER + COATING | COATING ALONE (CORRECTED) | PAPER + COATING (CORRECTED) |
|---|---|---|---|---|---|
| A15 | none (control) | 102 sec. | 4860 sec. | 8028 sec. | 8287 sec. |
| A16 | 1 | 90 | 2880 | 4708 | 4967 |
| A17 | 2 | 106 | 1650 | 2605 | 2864 |
| A18 | 3.12 | 98 | 1024 | 1562 | 1821 |
| A19 | 4.16 | 102 | 650 | 925 | 1184 |
| A20 | 5.2 | 110 | 412 | 510 | 769 |
| A21 | 6.24 | 116 | 302 | 314 | 573 |

Plotting the above values for Paper and Coating Corrected on a semi-log graph reveals that at least about 2.3% by total weight of perlite is needed in Formula A to give a 5 mil coating a porosity no greater in numerical value about 2500 seconds.

EXAMPLE 4

Yet another mix of Formula A was prepared. To verify that the porosity property did not depend on the brand of perlite used, there was added 2% by weight expanded perlite, fine grade, obtained from Silbrico Company and identified as "Ryolex No. 4". "Ryolex No. 4" has the following particle-size distribution:
On 60 standard mesh, none;
On 100 standard mesh, 0.5% max.;
On 200 standard mesh, 4.0% max.;
Through 325 standard mesh, 75.0% minimum.

This is substantially the same distribution as exists for Tennsil 2-C. Two coatings were drawn down on draw-down paper, and the porosities of the coatings alone before applying the correction factor were 806 and 748 seconds, values which were clearly comparable to the value of 804 seconds obtained in Example 2 at 2% weight.

EXAMPLE 5

Four mixes of Formula B were prepared by substituting an equal amount of small-sized particle acrylic emulsion (less than 0.2 microns particle size) for the polyvinyl acetate emulsion of Formula A. The brand of binder used was "Rhoplex AC-61" produced by Rohm & Haas Co. To these were added 0, 10, 20 and 40 pounds of Tennsil 2c as in Example 1, to obtain 0, 1, 2 and 4.16% by total weight expanded perlite coating compositions which were drawn down on draw-down paper at both 3 and 5 mil thicknesses. The tests showed the following porosities:

| FORMULA | WEIGHT % OF PERLITE | PAPER POROSITY | FILM THICKNESS | COATING ALONE CORRECTED | PAPER + COATING POROSITY CORRECTED |
|---|---|---|---|---|---|
| B1 | None (control) | 102 sec. | .003 inch | 19569 sec. | 19828 sec. |
| B2 | 1 | 100 | .003 | 5723 | 6282 |
| B3 | 2 | 98 | .003 | 2170 | 2,429 |
|  |  | 104 | .005 | 7384 | 7,643 |
| B4 | 4.16 | 98 | .003 | 628 | 887 |
|  |  | 112 | .005 | 1282 | 1,541 |

For the 3 mil thickness, the 2% expanded perlite-acrylic emulsion mixture is adequate, within experimental error, to provide the minimum acceptable porosity of about 2500 sec. Plotting the above values on semi-log paper reveals that, for 5 mil coating using the more impervious small-particle size acrylic emulsion, it is necessary to use at least about 3.5% expanded perlite.

EXAMPLE 6

Four mixes of a Formula C were prepared, each of which correspond to Formula A except that 320 lbs. of a 2.5% solution of Methocel, a cellulosic thickener supplied by Dow Chem. Co. and having 4000 cps viscosity, were added in place of the 320 lbs of water and in place of the 16 lbs of acrylic thickener. To these were added 0, 6.24, 7.25 and 8.29% expanded perlite (Tennsil 2-c). Porosity tests were made in all cases on a 3 mil coating. In the case of C1 and C2, the coatings were applied to draw-down paper. C3 and C4 were applied to gypsum board paper having 200 seconds porosity. Therefore, only the values for C2 were corrected using the correction factor discussed above, except that 200, rather than 259, was added as the final correction. The results were as follows:

| FORMULA | WEIGHT % OF PERLITE | PAPER POROSITY | PAPER + COATING POROSITY | COATING POROSITY |
|---|---|---|---|---|
| C1 | none | — | no reading could be made, as in 24 hours no air passed through. | |
| C2 | 6.24 | 104 | 3517 sec. | 3317 sec. |
| C3 | 7.25 | 202 | 1643 | 1441 |
| C4 | 8.29 | 192 | 692 | 500 |

Plotting the above on semi-log graph paper revealed that the amount of perlite needed in a 3 mil coating of Formula C to achieve the minimum porosity for the coated sheet of about 2500 seconds is at least 6.7%. It will be readily apparent, from the results of Examples 3 and 5, that considerably more is necessary for a 5 mil coating.

This example is representative of the drastic effect the added expanded inorganic particles have on a coating composition which is otherwise so impervious that even the slowest of drying speeds would probably cause blows if the coating were applied to gypsum board *without* the expanded inorganic particles. Indeed, it is estimated that Formula C is the "worst case"; i.e., the paint which is, without the expanded inorganic particles, the most impervious.

Although the invention has been described in connection with certain preferred embodiments, it is not limited thereto. For example, the porous coating composition of the invention can be applied to any gypsum surface which, though set, is still wet, as its porosity will permit the gypsum to dry. More specifically, the porous composition can be applied to wet plaster walls or plaster veneer walls without waiting for the latter to dry, thus speeding up the construction. Accordingly, it is intended that the invention cover all alternatives, equivalent arrangements, and embodiments as may be included in the scope of the following claims.

The embodiments of the invention in which an exclusive property or privilege is claimed are defined as follows:

1. In combination with a gypsum board having a core and a paper cover sheet securely laminated thereto, a coating composition;
   a. said cover sheet having a porosity between about 90 seconds and about 260 seconds as determined in accordance with the procedures of ASTM D 726–58; and
   b. said coating composition comprising a pigment binder and expanded inorganic particles present in an amount sufficient to provide the dried cover sheet and coating composition with a porosity of no higher number than about 2500 seconds as determined in accordance with the procedures of ASTM D 726–58, whereby said composition and said core are capable of being simultaneously dried without delaminating said sheet therefrom.

2. The combination as defined in claim 1, wherein the expanded inorganic particles are of a size in which at least 75% of the particles pass through a standard 325 mesh screen to avoid texturing the coating composition.

3. The combination as defined in claim 1, wherein the expanded inorganic particles are of a size passing through a 200 standard mesh screen.

4. The combination as defined in claim 1, wherein said binder is selected from the group consisting of an alkyd emulsion, an acrylic emulsion, and a polyvinyl acetate emulsion.

5. The combination as defined in claim 4, wherein said binder consists of particles no larger than 0.2 microns in size.

6. The combination as defined in claim 4, and further including a cellulosic thickener in said composition.

7. The combination as defined in claim 1, wherein said particles are expanded perlite.

8. In combination with a gypsum board to be dried having a wet gypsum core and a cover sheet to be securely laminated thereto in drying, said cover sheet having a porosity between about 90 and about 260 seconds as determined by ASTM D 726–58; a coating composition on said cover sheet comprising a pigment binder and expanded inorganic particles present in an amount sufficient to provide the coated cover sheet with a porosity of no higher number than about 2500 seconds as determined by ASTM D 726–58.

* * * * *